United States Patent
Brück et al.

(10) Patent No.: US 6,899,062 B2
(45) Date of Patent: May 31, 2005

(54) COOLING SYSTEM FOR A FUEL CELL MODULE AS PART OF AN ON-BOARD POWER SUPPLY

(75) Inventors: Rolf Brück, Bergisch Gladbach (DE); Joachim Grosse, Erlangen (DE); Manfred Poppinger, Uttenreuth (DE); Meike Reizig, Bad Münstereifel (DE)

(73) Assignees: Siemens Aktiengesellschaft, Munich (DE); EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 10/609,830

(22) Filed: Jun. 30, 2003

(65) Prior Publication Data

US 2004/0083989 A1 May 6, 2004

Related U.S. Application Data

(63) Continuation of application No. PCT/DE01/04884, filed on Dec. 21, 2001.

(30) Foreign Application Priority Data

Dec. 29, 2000 (DE) .......................................... 100 65 305

(51) Int. Cl.$^7$ ................................................. F01P 7/10
(52) U.S. Cl. ................................. 123/41.31; 123/41.49
(58) Field of Search ........................... 123/41.31, 41.29, 123/41.01, 3, 1 A

(56) References Cited

U.S. PATENT DOCUMENTS

| | | | |
|---|---|---|---|
| 5,537,956 A | 7/1996 | Rennfeld et al. | |
| 5,868,105 A | 2/1999 | Evans | |
| 6,210,822 B1 * | 4/2001 | Abersfelder et al. | ........... 429/19 |
| 6,276,473 B1 | 8/2001 | Zur Megede | |
| 6,294,277 B1 | 9/2001 | Ueno et al. | |
| 6,346,340 B1 | 2/2002 | Abersfelder et al. | |
| 6,427,639 B1 * | 8/2002 | Andrews et al. | ................ 123/3 |
| 6,588,522 B2 * | 7/2003 | Baumert et al. | ........... 180/65.1 |
| 6,595,433 B2 * | 7/2003 | Ap et al. | .................... 180/65.1 |
| 6,651,761 B1 * | 11/2003 | Hrovat et al. | .............. 180/65.3 |
| 6,743,539 B2 * | 6/2004 | Clingerman et al. | ........... 429/24 |

FOREIGN PATENT DOCUMENTS

| | | |
|---|---|---|
| DE | 43 27 261 C1 | 10/1994 |
| DE | 197 03 171 A1 | 8/1998 |
| DE | 198 59 543 A1 | 6/1999 |
| DE | 199 02 051 A1 | 8/2000 |
| DE | 199 13 794 A1 | 10/2000 |
| EP | 0 638 712 A1 | 2/1995 |
| EP | 0 751 045 A2 | 1/1997 |
| EP | 0 999 078 A1 | 5/2000 |
| JP | 2000303836 | 10/2000 |

* cited by examiner

*Primary Examiner*—Tony M. Argenbright
*Assistant Examiner*—Hyder Ali
(74) *Attorney, Agent, or Firm*—Laurence A. Greenberg; Werner H. Stemer; Gregory L. Mayback

(57) ABSTRACT

A fuel cell system is used for on-board power supply in a motor vehicle that is powered by an internal combustion engine. The blower fan that is used to cool the radiator of the engine also cools the fuel cell module and/or it provides the air feed for operating the fuel cell module.

10 Claims, 2 Drawing Sheets

COOLING SYSTEM FOR A FUEL CELL MODULE AS PART OF AN ON-BOARD POWER SUPPLY

CROSS-REFERENCE TO RELATED APPLICATION

This application is a continuation of copending International Application No. PCT/DE01/04884, filed Dec. 21, 2001, which designated the United States and which was not published in English.

BACKGROUND OF THE INVENTION

Field of the Invention

The invention relates to a motor vehicle having an internal combustion engine and having an on-board power supply, for which at least one fuel cell module, which is operated with ambient air as oxidizing agent and also has a cooling circuit, is used.

In conjunction with motor vehicles, fuel cells systems are generally to be used to supply energy to an electric motor which is present as a motive drive of the vehicle. It has already become known from German published patent applications DE 197 03 171 A1 and DE 199 02 051 A1 to provide only the on-board power supply or parts of the on-board power supply via a fuel cell system in motor vehicles with internal combustion engines. This may take place as an alternative or in addition to the generator which is customarily present.

To operate the fuel cells, it is necessary to supply a fuel, for example a fuel gas, on the one hand, and an oxidizing agent, on the other hand. The oxidizing agent used may be the oxygen in the ambient air, which in particular when the motor vehicle is driving is effected by the air stream. Furthermore, coolants are usually also required.

European patent application EP 0 751 045 A2 describes a power-generating system for a vehicle with an internal combustion engine, in which there is a fuel cell system instead of a generator for generating electrical energy to operate electric consumers. Furthermore, U.S. Pat. No. 5,868,105 A discloses a cooling system with a temperature-controlled expansion vessel in which an engine is cooled by the expansion of a gas. A fuel cell system is not discussed in that document.

Furthermore, Japanese patent application JP 2000-303836 A discloses a hybrid system comprising a fuel cell drive and internal combustion engine for use in a vehicle, in which thermal energy from the engine circuit is used to start the fuel cells. For this purpose, the water circuit of the motor is diverted to the fuel cell drive. A device for cooling vehicle components comprising a coolant circuit which includes heat exchangers is described in European published patent application EP 0 638 712 A1. On the other hand, a cooling/heating circuit system specifically for vehicles with a fuel cell drive is described in detail in European published patent application EP 0 999 078 A1.

SUMMARY OF THE INVENTION

It is accordingly an object of the invention to provide a motor vehicle with a combustion engine and on-board energy supply which overcomes the above-mentioned disadvantages of the heretofore-known devices and methods of this general type and which provides for an improved on-board power supply that incorporates a fuel cell system, specifically for a motor vehicle with an internal combustion engine.

With the foregoing and other objects in view there is provided, in accordance with the invention, a motor vehicle, comprising:

an internal combustion engine (e.g. diesel engine, Otto cycle engine, hydrogen combustion engine) with a cooling circuit;

an on-board power supply with at least one fuel cell module operated with ambient air as oxidizing agent, the fuel cell module having an air supply circuit and a cooling circuit;

a heat exchanger coupling at least one of the air supply circuit and cooling circuit of the fuel cell module with the cooling circuit of the internal combustion engine; and a fan associated with the cooling circuit of the internal combustion engine for cooling the internal combustion engine and configured for at least one of supplying air to the fuel cell module and cooling the fuel cell module.

In other words, the supply of air to and/or the cooling of the fuel cell module advantageously takes place by means of a fan, which supplies both the supply and/or cooling air for the fuel cell module. The fan may be controllable in two stages but may also be controllable in a continuously variable manner. It is preferable for the fan itself to be supplied with electrical energy by the fuel cell module. This allows optimum use of a fuel cell system for on-board power supply. In this case, the drive for the motor vehicle is an internal combustion engine, which may be a diesel engine, a spark-ignition engine or alternatively a hydrogen combustion engine.

In accordance with an added feature of the invention, there are provided a thermostatic valve connected in one of the air supply and cooling circuit of the fuel cell module, and a thermostatic valve connected in the cooling circuit of the engine, each for defining and setting predetermined temperatures.

In accordance with an additional feature of the invention, the thermostatic valves selectively connect bypass lines in the cooling circuits.

For the intended purpose, the fuel cell system comprises PEM fuel cells and may advantageously be formed by a fuel cell which is operated at relatively high temperatures, i.e., so-called high-temperature (HT)-PEM fuel cell.

In accordance with a concomitant preferred embodiment of the invention, the fuel cell module with the HT-PEM fuel cells is cooled by coolant in the cooling circuit, and a temperature of the coolant is controlled by the cooling circuit of the engine via the heat exchanger.

In sum, the blower system associated with the cooling circuit to cool the internal combustion engine also is provided the function of supplying air to the fuel cell module and/or cooling the fuel cell module.

Other features which are considered as characteristic for the invention are set forth in the appended claims.

Although the invention is illustrated and described herein as embodied in a cooling system for a fuel cell module as part of an on-board power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
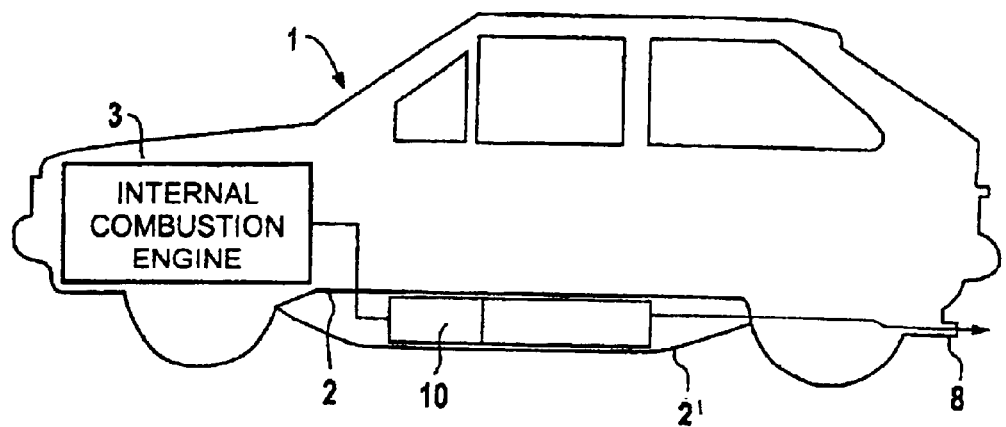
FIG. 1 is a diagrammatic side view of a motor vehicle with a fuel cell system for the on-board power supply.

Referring now to the figures of the drawing in detail and first, particularly, to FIG. 1 thereof, there is shown a motor vehicle 1 which has an internal combustion engine 3. The internal combustion engine 3 may be a diesel engine, a spark-ignition engine, or alternatively in particular a combustion engine operated with hydrogen. The internal combustion engine 3 is assigned an on-board power supply, which in a motor vehicle 1 has hitherto customarily been formed of a battery which can be charged in particular by means of the generator which is present in the motor vehicle 1.

In FIG. 1, a fuel cell system with at least one fuel cell module 10 is arranged at a suitable point in the motor vehicle 1. By way of example, the figure illustrates a single fuel cell module 10 without auxiliary equipment, the intention being for the fuel cell module 10 to be used exclusively for the on-board power supply. The fuel cell module 10 is arranged beneath the floor 2 of the motor vehicle 1 or in a free space formed between the floorboard 2 and a further floor 2'. The figure also indicates an exhaust 8, from which, in the case of the fuel cell module 10 being operated with pure hydrogen and oxygen or air, the process water which is formed or, in the case of operation with hydrogen-rich gases with auxiliary constituents, the latter can escape.

The fuel cell module 10 selected is, in particular, a PEM fuel cell (polymer electrolyte membrane, proton exchange membrane) which operates with a proton-conducting membrane. A PEM fuel cell of this type operates with hydrogen, gasoline, methanol or another fuel, from which a hydrogen-rich fuel gas is obtained by way of a reformer. In the fuel cell, the hydrogen reacts with oxygen which is obtained from the ambient air. In particular the HT-PEM fuel cell (high-temperature PEM), which is operated at relatively high temperatures, has proven to be the fuel cell system of choice. HT-PEM fuel cells of this type operate at temperatures above the usual operating temperature of the PEM fuel cell of 60° C., specifically from 80° C. to approximately 300° C. The suitable operating temperature is approximately between 120° C. and 200° C.

As has been mentioned, to operate in particular HT-PEM fuel cells, it is necessary to provide oxygen as oxidizing agent, which is advantageously obtained from the ambient air. Furthermore, at the elevated operating temperature, the fuel cells should be held at a constant temperature. Therefore, they must also be cooled. It is therefore necessary to supply air to and cool the fuel cell module 10.

Process management of a fuel cell system having one or more fuel cell modules requires fluid line systems for supplying process gas, on the one hand, and for cooling, on the other hand. Especially for HT-PEM fuel cells, it is customary to use an oil as coolant. Water is not suitable for cooling in the case of HT-PEM fuel cells, on account of the operating temperatures of between 120° C. and 200°.

Figure 2:
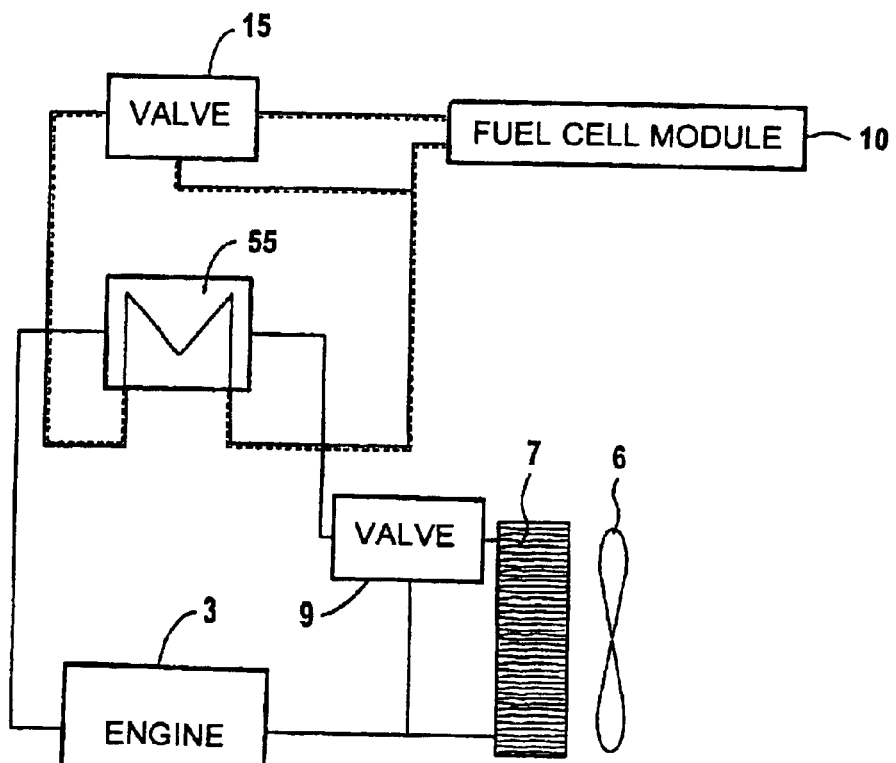
FIG. 2 is a block diagram of the configuration of the on-board power supply in a vehicle as shown in FIG. 1.

In FIG. 2, the fluid line of the cell module 10 includes a thermostatic valve 15 for setting and defining the operating temperature in the fuel cell system. There is also a heat exchanger 55 which is thermally coupled to the internal combustion engine 3 shown in FIG. 1. This heat exchanger 55 is formed with two circuits, in such a manner that it is actuated by the vehicle radiator 7, which is responsible for cooling the internal combustion engine 3 and has a fan 6 and a further thermostatic valve 9 for definition of the engine cooling circuit. The vehicle radiator 7 includes, in a known way, a non-illustrated coolant pump, which is used to deliver the coolant for the engine 3 in a pressure-tight system.

The overall system with the two subcircuits illustrated in FIG. 2 results in temperature compensation between the internal combustion engine 3 and the fuel cell module 10. In this case, the fan 6, which is usually also operated by way of the on-board power supply, can also perform the function of supplying air to the fuel cell module 10 and cooling it.

Figure 3:
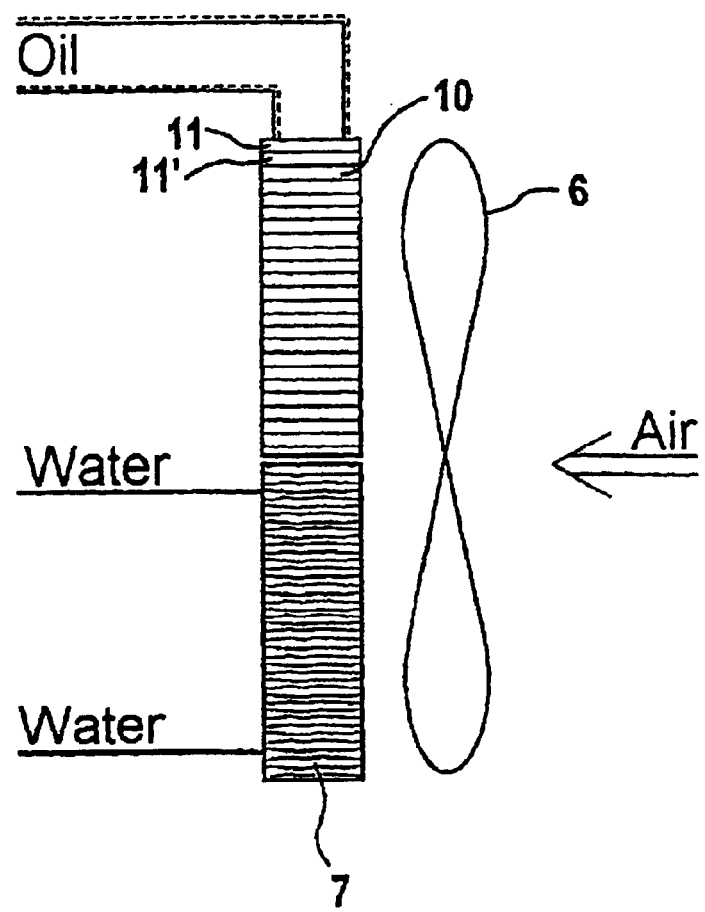
FIG. 3 is a diagram illustrating an advantageous association between fuel cell module and motor vehicle radiator.

That dual function becomes clear from FIG. 3: Here, the radiator 7 and the fuel cell module 10, with its stack of individual fuel cells 11, 11', etc., are assigned to the fan 6 in such a manner that they are both supplied by the flow of air generated by the fan 6. It this context, it is also possible to use the flow of air which emerges from the motor vehicle radiator 7, which, on account of the heat exchange which has taken place, is at a higher temperature than ambient temperature, to preheat the fuel cell air. In practice, this means that the oil-cooled fuel cell module 10 in the motor vehicle 1 shown in FIG. 1 is arranged in the vicinity of the fan 6.

In another embodiment, by contrast, the flow of air generated by the fan 6 and the flow of fuel gas are first of all passed via a heat exchanger, in particular the heat exchanger 55 shown in FIG. 2. This makes it possible to preheat both the fuel gas and oxidizing agent process gases, which is particularly advantageous for HT-PEM fuel cells.

The configuration described above results in optimum operation in particular of HT-PEM fuel cells in a motor vehicle which has an internal combustion engine and in which a fuel cell system is provided only for the on-board power supply. In this case, it is particularly advantageous to use HT-PEM fuel cells, since the operating temperature of these fuel cells is at from 120° C. to 200° C., or in any event above the level of the coolant temperature of the internal combustion engine of up to 120° C., which is reached at a pressure above atmospheric pressure. Consequently, a suitable temperature difference for cooling of the fuel cell module is always defined. It is also possible to provide air, which has been preheated to this temperature as oxidizing agent.

We claim:

1. A motor vehicle, comprising:
    an internal combustion engine with a cooling circuit;
    an on-board power supply with at least one fuel cell module operated with ambient air as oxidizing agent, said fuel cell module having an air supply circuit and a cooling circuit;
    a heat exchanger coupling at least one of said air supply circuit and cooling circuit of said fuel cell module with said cooling circuit of said internal combustion engine; and
    a fan associated with said cooling circuit of said internal combustion engine for cooling said internal combustion engine and configured for at least one of supplying air to said fuel cell module and cooling said fuel cell module.

2. The motor vehicle according to claim 1, wherein said fan is supplied with electric current by said fuel cell module.

3. The motor vehicle according to claim 2, wherein said fan is a two-stage fan to be controlled in two stages.

4. The motor vehicle according to claim 2, wherein said fan is a variable-control fan to be controlled in a continuously variable manner.

5. The motor vehicle according to claim 1, wherein said internal combustion engine is an engine selected from the group consisting of a diesel engine, a spark-ignition engine, and a hydrogen combustion engine.

6. The motor vehicle according to claim 1, which comprises a thermostatic valve connected in one of said air supply and cooling circuit of said fuel cell module, and a thermostatic valve connected in said cooling circuit of said engine, each for defining and setting predetermined temperatures.

7. The motor vehicle according to claim 6, wherein said thermostatic valves selectively connect bypass lines in said cooling circuits.

8. The motor vehicle according to claim 1, wherein said fuel cell module includes HT-PEM fuel cells.

9. The motor vehicle according to claim 8, wherein said fuel cell module with said HT-PEM fuel cells is cooled by coolant in said cooling circuit, and a temperature of said coolant is controlled by said cooling circuit of said engine via said heat exchanger.

10. In a motor vehicle having an internal combustion engine with a cooling circuit and a fan associated with the cooling circuit to cool the internal combustion engine, an on-board power supply, comprising:

at least one fuel cell module operated with ambient air as oxidizing agent, said fuel cell module having an air supply circuit and a cooling circuit;

a heat exchanger coupling at least one of said air supply circuit and cooling circuit of said fuel cell module with the cooling circuit of the internal combustion engine; and wherein the fan associated with the cooling circuit to cool the internal combustion engine also is disposed to perform at least one of the functions of supplying air to said fuel cell module and cooling said fuel cell module.

* * * * *